United States Patent [19]

Ozeki

[11] 4,338,006
[45] Jul. 6, 1982

[54] OVERHEAD PROJECTOR

[75] Inventor: Jiro Ozeki, Tokyo, Japan

[73] Assignee: Slidex Corporation, Tokyo, Japan

[21] Appl. No.: 112,353

[22] Filed: Jan. 15, 1980

[30] Foreign Application Priority Data

Jan. 17, 1979 [JP] Japan ................................ 54-4095

[51] Int. Cl.³ .................... G03B 21/20; G03B 21/132
[52] U.S. Cl. ........................................ 353/85; 353/87; 353/DIG. 3; 353/102
[58] Field of Search ............... 353/78, 85, 87, 101, 353/102, DIG. 3, DIG. 4, DIG. 5

[56] References Cited

U.S. PATENT DOCUMENTS

| 2,669,156 | 2/1954 | Fitzgerald | 353/101 |
| 2,878,718 | 3/1959 | Post | 353/76 |
| 2,937,569 | 5/1960 | Wilton | 353/78 |
| 3,244,069 | 4/1966 | Field | 353/87 |
| 3,529,146 | 9/1970 | Betlejewski et al. | 353/87 |
| 3,719,419 | 3/1973 | Davee | 353/101 |

FOREIGN PATENT DOCUMENTS

| 764848 | 10/1954 | Fed. Rep. of Germany | 353/102 |
| 2300705 | 7/1974 | Fed. Rep. of Germany | 353/85 |

Primary Examiner—John W. Shepperd
Attorney, Agent, or Firm—Fleit & Jacobson

[57] ABSTRACT

A disclosed projector includes a condenser lens, a plurality of light source means having different focal lengths and disposed around the condenser lens, a projecting lens with an adjustable distance from the condenser lens, and a stage glass located between the condenser and projecting lens for carrying a transparent positive thereon. Depending on the size of the transparent positive, one of the light source means is selected and the distance between the condenser and projecting lens is adjusted, so as to project an image of substantially fixed magnitude with a constant brightness regardless of said size of the transparent positive.

2 Claims, 3 Drawing Figures

OVERHEAD PROJECTOR

BACKGROUND OF THE INVENTION

1. Field of the Invention

This invention relates to an overhead projector, and more particularly to an overhead projector capable of projecting a picture image of substantially fixed magnitude with a constant brightness onto a screen regardless of the size of a transparent positive placed on a stage glass thereof.

2. Description of the Prior Art

A typical overhead projector of prior art comprises a projector body having a light source system disposed in a housing so as to face upward, a condenser lens disposed above the light source system, and a stage glass closing a top opening of the housing, whereby a transparent positive is placed on the stage glass and luminous flux coming through the transparent positive is converged by the aforesaid condenser lens at a point outside the housing and then diverged by a projecting lens, for projecting a picture image of the transparent positive onto a screen of a certain dimension by means of a projecting reflective mirror.

With such an overhead projector of the prior art, in order to project a picture image which is clear throughout the entire screen of the certain dimension, the size of the stage glass is made substantially similar to that of the transparent positive and the light source system in the housing is provided with a sufficient luminous power and a sufficient luminous flux for projecting the transparent positive. Thus, the overhead projector of the prior art has shortcomings in that it is impossible to project a transparent positive having a size larger than the dimension for which the projector is designed and that, when a transparent positive which is smaller than the aforesaid dimension is used, a relatively small picture image proportionate to the size of the transparent positive is projected on the screen, so that the excessive glaring at the periphery of the screen around the projected small picture image disturbs the appreciation of picture image and makes it very difficult to effect detailed checking and study of a complicated picture image.

SUMMARY OF THE INVENTION

Therefore, an object of the present invention is to obviate the aforesaid difficulties of the prior art technique. With the present invention, a plurality of light source system elements are radially disposed in a housing, and the relative position between at least a part of the light source systems and a light-upward-directing mirror for directing the luminous flux coming from the light source system upward is selectively adjusted so as to match the size of a transparent positive to be projected, while a projecting lens itself and the position of the projecting lens are suitably selected, so as to project an image of substantially fixed magnitude with a constant brightness throughout the screen regardless of the size of the transparent positive.

BRIEF DESCRIPTION OF THE DRAWINGS

For a better understanding of the present invention, reference is made to the accompanying drawings, in which.

Like parts are designated by like numerals through the different drawings.

DESCRIPTION OF THE PREFERRED EMBODIMENTS

Figure 1:
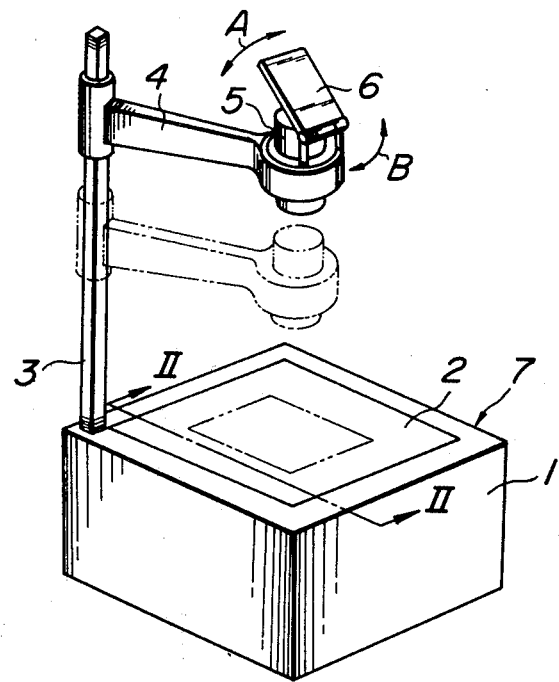
FIG. 1 is a perspective view of an embodiment of the present invention.

Referring to FIG. 1 showing a schematic perspective view of an overhead projector according to the present invention, 1 is a box-like housing, 2 is a stage glass closing a top opening of the housing 1, 3 is an upright pole member having a lower end thereof fixed to the housing 1, and 4 is an arm member having one end thereof mounted on the pole member 3 so as to be vertically movable. The arm member 4 carries a replaceable projecting lens 5 at the opposite end thereof and also carries a projecting reflective mirror 6 for projecting a luminous flux coming from the projecting lens 5 onto a screen which is not shown. The projecting reflective mirror 6 is a planar reflective mirror and one edge of the mirror 6 is hinged to an annular member disposed at the aforesaid other end of the arm member 4 so as to be rotatable around the optical axis of the projecting lens 5. Thus, the projecting position of a picture image can be adjusted vertically and horizontally by moving the reflective mirror 6 in the directions of the arrows A and B, respectively.

Figure 2:
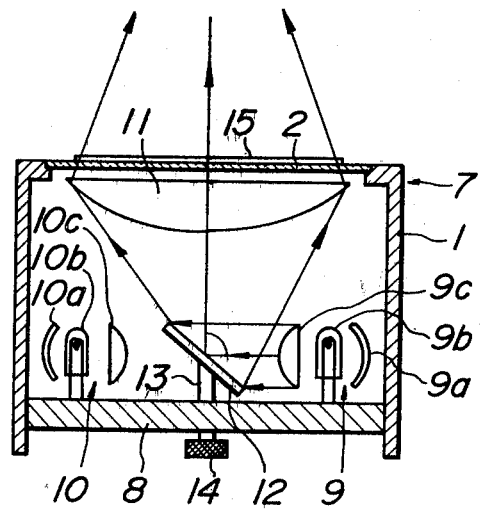
FIG. 2 is a sectional view taken along the line II—II of FIG. 1.

In FIG. 2 showing a schematic sectional view taken along the line II—II of FIG. 1, a projector body 7 includes a plurality of light source systems 9, 10 fixed on a bottom wall 8 of the housing 1, the aforesaid stage glass 2 and a condenser lens 11 disposed directly below the stage glass 2. The light source systems 9, 10 are disposed in such a manner that the optical axes thereof intersect the optical axis of the condenser lens 11 at one point and the light source systems are located along radii around said one point of the optical axis of the condenser lens 11. Each kof the light source systems comprises a concave reflective mirror 9a, 10a, a light source lamp 9b, 10b, and a light source lens 9c, 10c, respectively. The lenses 9c, and 10c have different focal lengths with each other and are selectively used depending on the size of the transparent positive, as will be described hereinafter.

In the illustrated embodiment, only two light source systems are shown and the optical axes of the light source systems intersect the optical axis of the condenser lens 11 at right angles, but it is also possible to use three or more light source systems and to make the intersecting angle α between the optical axis of the condenser lens and those of the light source systems which is an acute angle or an obtuse angle. This intersecting point of the optical axis is also provided with a planar reflective mirror 12 for upwardly directing luminous fluxes, and the reflective mirror 12 is so inclined that the liminous flux coming along the optical axis of each light source system can be so reflected as to proceed along the optical axis of the condenser lens 11. In addition, a rod 13 fixed to the rear surface of the reflective mirror 12 extends through the bottom wall 8 of the housing 1 so as to be journalled by the bottom wall 8. A handle or a knob 13 is provided at the lower end of the rod 14, for facilitating the rotation of the reflective mirror 12 around the optical axis of the condenser lens 11 toward optical axes of individual light source systems.

In operation of the overhead projector of the aforesaid construction, if it is desired to project the picture image of a transparent positive 15 whose size is substantially identical with that of the stage glass 2, for instance, the light-upward-directing mirror 12 is rotated to the direction of the light source system 9 having a light source lens 9c with a long focal length, so as to cause the condenser lens 11 to pass the luminous flux through the entire span of the transparent positive 15. The luminous flux coming through the transparent positive 15 is diverged by the projecting lens 5 disposed at the converging position of the luminous flux from the condenser lens, and the diverged luminous flux is then reflexed by the projecting reflective mirror 6, normally horizontally. As a result, the picture image with a desired brightness is clearly projected onto the entire span of the screen which is not shown.

When it becomes necessary during successive projections, of a series of transparent positives or in a separate occasion to project a picture image of a transparent whose size is smaller than that of the stage glass, e.g., a small-sized transparent positive as shown by phantom lines of FIG. 1, at first the knob 14 is so turned as to rotate the reflective mirror 12 to the direction of the light source system 10 with a light source lens 10c with a short focal length. Then, the arm member 4 is lowered to the position as shown by phantom lines of FIG. 1 and the projecting lens 5 is replaced with another projecting lens which has a required focal length. Besides, the inclination of the projecting reflective mirror 6 is adjusted or the position of the screen which is not shown is adjusted by moving, so that a clear image picture can be projected onto the entire span of the screen of a fixed magnitude.

In this case, the light source lens 10c of the light source system 10 acts to reduce the area of the luminous flux arriving at the surface of the reflective mirror 12 as compared with the case of using the light source system 9, so that the area passed by the upward luminous flux from the reflective mirror 12 is also made small. As a result, the area of the luminous flux passing through the condenser lens 11 and the stage glass 2 is also smaller than that in the case of using the light source system 9, and such small-area luminous flux passes through the transparent positive at a zone corresponding to that defined by the periphery of a small-sized transparent positive placed on the stage glass, and the light source lens 10c and the condenser lens 11 coact in causing the small-sized luminous flux to converge at a position nearer to the transparent positive as compared with the case of using the light source system 9. Furthermore, the replaced projecting lens, which is now lowered to that converging position as shown by the phantom lines of FIG. 1, has the same focal length as the distance to the transparent positive and act to diverge the luminous flux from the condenser lens, and then the projecting reflective mirror 6 directs the luminous flux toward the screen which is not shown for projecting a clear picture image onto the entire span of the screen.

Figure 3:
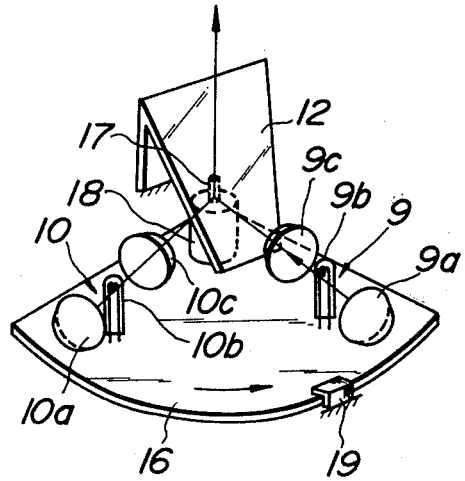
FIG. 3 is a schematic perspective view of another embodiment of the present invention.

FIG. 3 shows a perspective view of a modified embodiment of the present invention, wherein a light-upward-directing reflective mirror 12 is fixed to a housing 1, and a sector plate 16 carrying the entire light source system 9, 10 similar to those as described hereinbefore is so disposed as to be rotatable about the optical axis of a condenser lens 11. In the figure, 17 is a pin projecting from the bottom wall 8 of a housing 1, 18 is a boss fixed to the sector plate, and 19 is a guide member.

In this embodiment, the sector plate 16 is rotatable by a handle or other similar means which is not shown, for suitably selecting a light source system by causing it to face the reflective mirror 12. Otherwise, the function of this embodiment is similar to the preceding embodiment which has been described hereinbefore by referring to FIGS. 1 and 2.

It is needless to say that a registering means, which is not shown, is provided in each embodiment for accurately directing any of the light source systems 9 and 10 toward the reflective mirror 12.

The embodiment shown in FIG. 3 causes the entire light source systems 9 and 10 to rotate relative to the reflective mirror 12 whose position is fixed, but it is also possible to achieve the same functions and effects as described above, for instance, by fixing a light source lamp with a sufficient amount of light and a concave reflective mirror as well as the reflective mirro 12 while rotating only light source lenses having different focal lengths. Furthermore, it is also possible for allowing relative rotation among the reflective mirror 12, light source lamps with concave reflective mirrors, and light source lenses, for selectively using light source lamps with different luminous intensities depending on needs.

As described in the foregoing, with the present invention, it is possible to project the picture images of differently sized transparent positives always onto the entire span of a screen of fixed magnitude with sufficient clearness. Thus, the present invention has outstanding advantages in that checking and appreciation of picture images can be easily effected and that the need of using different projectors, for differently sized transparent positives is eliminated.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. An overhead projector comprising a projector body having a housing with a plurality of light source systems disposed in a light source plane therein, a condenser lens disposed at a level above the plane and having an optical axis perpendicular to the light source plane, a stage glass attached to said housing so as to close a top opening of said housing, a projecting lens disposed outside said housing at a point above said stage glass, a projecting reflective mirror reflecting light coming through said projecting lens toward a screen, and a light-upward-directing reflective mirror disposed in the light source plane within said housing and having a mirror plane crossing the optical axis of said condenser lens at an angle for reflecting light from said light source systems toward said condenser lens, elements constituting at least a part of said light source systems being radially disposed around said optical axis of the condenser lens so that optical axes of said light source systems intersect at a point on said optical axis of the condenser lens, said light-upward-directing reflective mirror and said part of the light source systems being movable relative to each other, and said projecting lens being vertically movable and being replaceable, wherein said light source systems are fixed and said light-upward-directing reflective mirror is located on and rotatable about the axis of said condenser lens, each of said light source systems comprising a concave reflective mirror, a light source lamp of a given luminous intensity, and a light source lens of a given focal length, wherein said given luminous intensity of each said light source lamp differs from the given luminous intensities of the other said light source lamps, and said given focal length of each said light source lens differs from the given focal lengths of the other said light source lenses, the light-upward-directing reflective mirror being rotatable about the axis of said condenser lens to direct light from any one of said light source systems upwardly to said condenser lens, whereby said projector is selectably usable for different sizes of transparent positive film slides and projects an image of substantially fixed magnitude and constant brightness throughout the screen, regardless of the size of the transparent positive film slide placed on the projector.

2. An overhead projector comprising a projector body having a housing with a plurality of light source systems disposed in a light source plane therein, a condenser lens disposed at a level above the plane and having an optical axis perpendicular to the light source plane, a stage glass attached to said housing so as to close a top opening of said housing, a projecting lens disposed outside said housing at a point above said stage glass, a projecting reflective mirror reflecting light coming through said projecting lens toward a screen, and a light-upward-directing reflective mirror disposed in the light source plane within said housing and having a mirror plane crossing the optical axis of said condenser lens at an angle for reflecting light from said light source systems toward said condenser lens, elements constituting at least a part of said light source systems being radially disposed around said optical axis of the condenser lens so that the optical axes of said light source systems intersect at a point on said optical axis of the condenser lens, said light-upward-directing reflective mirror and said part of the light source systems being movable relative to each other, and said projecting lens being vertically movable and being replaceable, wherein said light-upward-directing reflective mirror is fixed and said light source systems are movable in the light source plane around the axis of said condenser lens, each of said light source systems comprising a concave reflective mirror, a light source lamp of a given luminous intensity, and a light source lens of a given focal length, wherein said given luminous intensity of each said light source lamp differs from the given luminous intensities of the other said light source lamps, and said given focal length of each said light source lens differs from the given focal lengths of the other said light source lenses, said light-upward-directing reflective mirror reflecting light from any one of said light source systems upwardly to said condenser lens, whereby said projector is selectably usable for different sizes of transparent positive film slides and projects an image of substantially fixed magnitude and constant brightness throughout the screen, regardless of the size of the transparent positive film slide placed on the projector.

* * * * *